(12) United States Patent
Camenisch et al.

(10) Patent No.: US 7,551,737 B2
(45) Date of Patent: Jun. 23, 2009

(54) CRYPTOGRAPHIC KEYS USING RANDOM NUMBERS INSTEAD OF RANDOM PRIMES

(75) Inventors: Jan Camenisch, Rueschlikon (CH); Maciej A Koprowski, Gdynia (PL)

(73) Assignee: International Business Machines Corporation, Armonk, NY (US)

( * ) Notice: Subject to any disclaimer, the term of this patent is extended or adjusted under 35 U.S.C. 154(b) by 631 days.

(21) Appl. No.: 10/809,267

(22) Filed: Mar. 25, 2004

(65) Prior Publication Data

US 2005/0018852 A1    Jan. 27, 2005

(30) Foreign Application Priority Data

Mar. 31, 2003   (EP)  ................... 03007217

(51) Int. Cl.
   *H04L 9/22*   (2006.01)
   *H04L 9/28*   (2006.01)
   *H04L 9/30*   (2006.01)

(52) U.S. Cl. .............. 380/44; 380/28; 380/29; 380/30; 380/46; 380/47; 713/176; 713/180; 713/181

(58) Field of Classification Search ............. 380/28, 380/29, 30, 44, 46, 47; 713/180, 181, 176
   See application file for complete search history.

(56) References Cited

U.S. PATENT DOCUMENTS

| | | | | |
|---|---|---|---|---|
| 4,933,970 A * | 6/1990 | Shamir | ............... | 380/30 |
| 4,949,380 A * | 8/1990 | Chaum | ............... | 380/30 |
| 4,996,711 A * | 2/1991 | Chaum | ............... | 380/30 |
| 5,265,164 A * | 11/1993 | Matyas et al. | ............... | 380/30 |
| 5,519,778 A * | 5/1996 | Leighton et al. | ............... | 380/30 |
| 5,647,000 A * | 7/1997 | Leighton | ............... | 380/30 |
| 5,675,649 A * | 10/1997 | Brennan et al. | ............... | 380/286 |
| 5,768,389 A * | 6/1998 | Ishii | ............... | 380/30 |
| 6,125,445 A * | 9/2000 | Arditti et al. | ............... | 713/169 |
| 6,381,699 B2 * | 4/2002 | Kocher et al. | ............... | 713/172 |
| 6,578,144 B1 * | 6/2003 | Gennaro et al. | ............... | 713/176 |
| 7,127,063 B2 * | 10/2006 | Lambert et al. | ............... | 380/44 |
| 2003/0120931 A1 * | 6/2003 | Hopkins et al. | ............... | 713/180 |

OTHER PUBLICATIONS

Fabrice Boudot, Efficient proofs that a committed number lies in an interval, EOROCRYPT 2000, LNCS 1807, pp. 431-444, 2000, Springer-Verlag Berlin Heidelberg 2000.*

* cited by examiner

*Primary Examiner*—Nasser G Moazzami
*Assistant Examiner*—Fatoumata Traore
(74) *Attorney, Agent, or Firm*—Scully, Scott, Murphy & Presser, P.C.; Kenneth R. Corsello, Esq.

(57) ABSTRACT

A system and method for providing cryptographic keys which are usable in a network of connected computer nodes applying a signature scheme. The method employs: generating a random secret key usable in the network of connected computer nodes; generating an exponent interval I having a plurality of exponent elements, the exponent interval having a specified first random limit, wherein each element of the plurality of exponent elements of the exponent interval has a unique prime factor tat is larger than a given security parameter; and, providing a public key comprising an exponent-interval description including The first random limit, and a public key value derived from the random secret key, such That the random secret key and a selected exponent value from the plurality of exponent elements in the exponent interval I are usable for deriving a signature value on a message to be sent within The network to a second computer node for verification.

7 Claims, 4 Drawing Sheets

CRYPTOGRAPHIC KEYS USING RANDOM NUMBERS INSTEAD OF RANDOM PRIMES

TECHNICAL FIELD

The present invention relates to a method for providing cryptographic keys usable in a network of connected computer nodes applying a signature scheme. Further, the present invention relates to a method for providing a signature value on a message in a network of connected computer nodes. Moreover, the present invention also relates to a method for verifying a signature value on a message in a network of connected computer nodes.

BACKGROUND OF THE INVENTION

Many cryptographic schemes require the generation of a (random) prime each time it is used. Examples are signature schemes, group signature schemes, or credential systems, such as the so-called Cramer-Shoup signature scheme by R. Cramer and V. Shoup "Signature schemes based on the strong RSA assumption." In Proc. 6th ACM Conference on Computer and Communications Security, pages 46-52. ACM press, November 1999, or the credential system by J. Camenisch and A. Lysyanskaya in their article "Efficient non-transferable anonymous multi-show credential system with optional anonymity revocation." In B. Pfitzmann, editor, Advances in Cryptology—EUROCRYPT 2001, volume 2045 of LNCS, pages 93-118, Springer Verlag, 2001. The security of all these schemes is based on the so-called strong RSA assumption. More precisely, their security proofs require that each signatures or credentials is computed using a unique prime, i.e., the computation of each signature or credential involves computing an e-th root where e is said unique prime. The e is also referred to as unique exponent in the following.

Unfortunately, the generation of primes is computationally expensive, especially if they need to be large. Because of this, the generation of signatures or credentials in the above mentioned schemes becomes computationally involved.

For the generation of primes one could in principle each time choose any integer as unique exponent, as long as it possesses a prime factor that does not appear in any unique exponent that was used before. This would require to store all exponents used so far and test the newly chosen exponent against these numbers; which, however, is very inefficient.

From the above it follows that there is still a need in the art that the generation of a signature is simplified for these schemes. Usually, a new prime is necessary each time a signature is generated, this is rather inefficient. Therefore, it is advantageous to provide cryptographic keys and signature values more efficiently. Each signature value should be verifiable.

Glossary

The following are informal definitions to aid in the understanding of the description.

Credential: In the present context is understood under the term credential, a subset of access permissions (developed with the use of media-independent data) attesting to, or establishing, the identity of an entity, such as a birth certificate, driver's license, mother's maiden name, social security number, fingerprint, voice print, or other biometric parameter(s). Moreover, the credential comprises information, passed from one entity to another, used to establish the sending entity's access rights. The term certificate is understood as a particular credential stating that a certain public key belongs to a certain entity or user.

Signature: A digital signature consists of one or more values that relate a message to a public key. A signature can only be produced using the secret key corresponding to the public key.

The following signs relate to the terms indicated beside and are used within the description.

| | |
|---|---|
| A, B, C, D | computer nodes |
| p, q | primes |
| n | product of p and q |
| sk | secret key being derived from p and q |
| A | first random limit |
| v | interval widths |
| A, v | exponent-interval description |
| I | exponent interval |
| u, l | security parameter |
| e | exponent value |
| e' | random prime |
| m | message |
| x' | verification value |
| H | hash function |
| $QR_n$ | elements having a square root modulo n |
| y', h, x | elements of $QR_n$ |
| y | computed signature root value |
| y, y', e | signature value |
| h, x | public values |
| n, h, x, e', I | public key value |
| pk | public key comprising public key value (n, h, x, e', I) and exponent-interval description (A, v) |
| u | random bit-numbers |

SUMMARY OF THE INVENTION

Thus, this invention provides systems, apparatus and methods providing an efficient scheme for generating a unique exponent or exponent value such that it is no longer necessary to generate a new prime for each use of them. In an example embodiment, the scheme uses integers drawn from a particular interval instead of primes. Because choosing a random integer is much more efficient than choosing a prime at random, the issuing of signatures or credentials in resulting schemes will be more efficient. An observation that allows one to use composites, i.e. non-primes, instead of primes as in the above mentioned scheme is that it is in fact sufficient for the schemes' security if each unique exponent has a unique prime factor that is sufficiently large.

In accordance with a first aspect of the present invention, there is given a method for providing cryptographic keys usable in a network of connected computer nodes A, B, C, D applying a signature scheme. The method executable by a first computer node A comprising the steps of:

generating a random secret key sk;

generating an exponent interval I having a first random limit A, wherein, with a probability close to certainty, each element of the exponent interval I has a unique prime factor that is larger than a given security parameter l;

providing a public key pk comprising an exponent-interval description A, v and a public key value n, h, x, e', I derived from the random secret key sk, such that the random secret key sk and a selected exponent value e from the exponent interval I are usable for deriving a signature value y, y', e on a message m to be sent within the network to a second computer node B, C, D for verification.

In accordance with a second aspect of the present invention, there is given a method for providing a signature value y, y', e on a message m in a network of connected computer nodes A, B, C, D, the method executable by a first computer node A comprising the steps of:

selecting an exponent value e from an exponent interval I, wherein each element of the exponent interval I has, with a probability close to certainty, a unique prime factor that is larger than a given security parameter l; and deriving the signature value y, y', e from a provided secret key sk, the selected exponent value e, and the message m, the signature value y, y', e being sendable within the network to a second computer node B, C, D for verification.

In accordance with a third aspect of the present invention, there is given a method for verifying a signature value y, y', e on a message m in a network of connected computer nodes A, B, C, D, the method executable by a second computer B, C, D node comprising the steps of:

receiving the signature value y, y', e from a first computer node A; and verifying whether an exponent value e is contained in an exponent interval I, wherein each element of the exponent interval I has, with a probability close to certainty, a unique prime factor that is larger than a given security parameter l, the signature value y, y', e is invalid if the exponent value e is not contained in the exponent interval I.

BRIEF DESCRIPTION OF THE DRAWINGS

The invention and its embodiments will be more fully appreciated by reference to the following detailed description of advantageous and illustrative embodiments in accordance with the present invention when taken in conjunction with the accompanying drawings.

Figure 1:
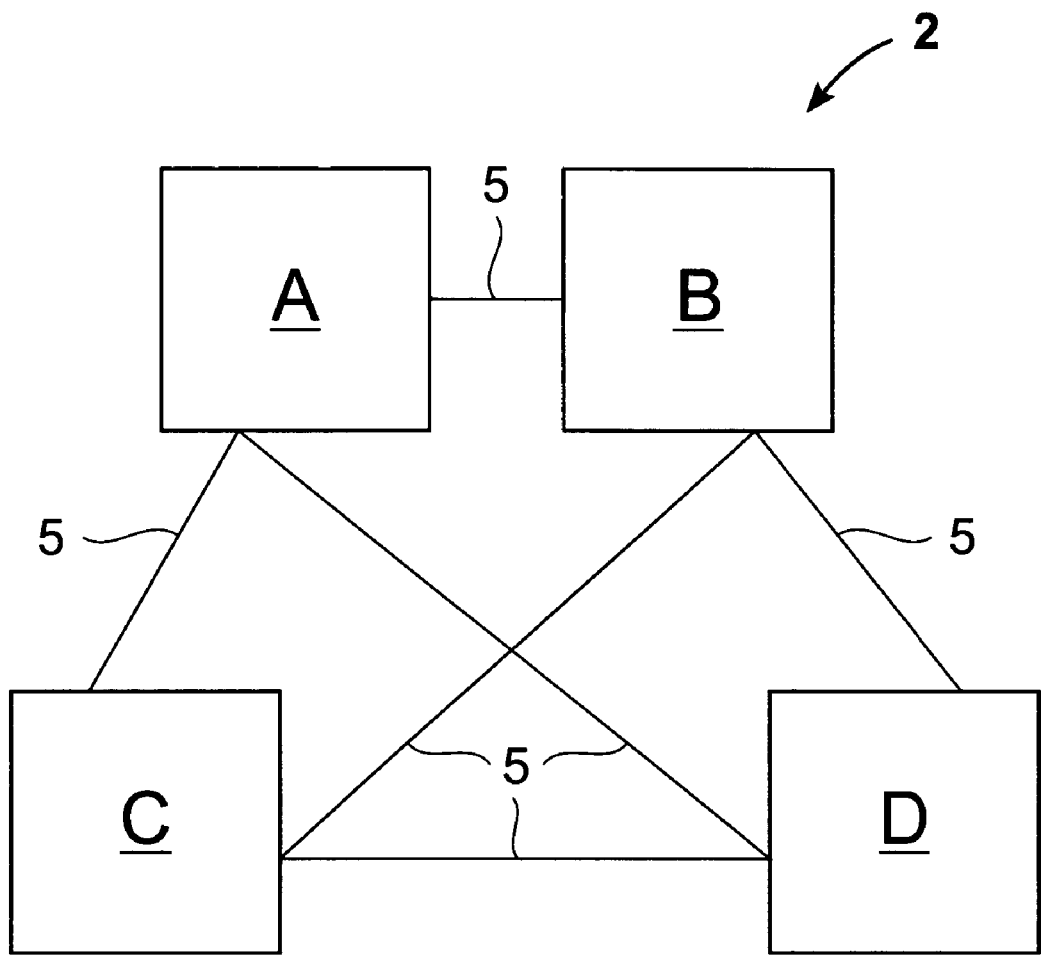
FIG. 1 shows a typical network with multiple computer nodes.

The drawings are provided for illustrative purpose only and do not necessarily represent practical examples of the present invention to scale.

DETAILED DESCRIPTION OF THE INVENTION

Thus, this invention provides an efficient scheme for generating a unique exponent or exponent value such that it is no longer necessary to generate a new prime for each use of them. In an example embodiment, the scheme uses integers drawn from a particular interval instead of primes. Because choosing a random integer is much more efficient than choosing a prime at random, the issuing of signatures or credentials in resulting schemes will be more efficient. An observation that allows one to use composites, i.e. non-primes, instead of primes as in the above mentioned scheme is that it is in fact sufficient for the schemes' security if each unique exponent has a unique prime factor that is sufficiently large.

In general, at first a sufficiently large set of integers is determined such that all the integers in the set have a unique prime factor. Once this set is specified, one chooses as unique exponent a random element from the set. If the set is sufficiently large, one will with high probability not select the same element twice. This is most efficient if the set is an interval. Below it is described how to determine intervals such that each integer in the interval has a unique prime factor.

In accordance with a first aspect of the present invention, there is given a method for providing cryptographic keys usable in a network of connected computer nodes A, B, C, D applying a signature scheme. The method executable by a first computer node A comprising the steps of:

generating a random secret key sk;

generating an exponent interval I having a first random limit A, wherein, with a probability close to certainty, each element of the exponent interval I has a unique prime factor that is larger than a given security parameter l;

providing a public key pk comprising an exponent-interval description A, v and a public key value n, h, x, e', I derived from the random secret key sk, such that the random secret key sk and a selected exponent value e from the exponent interval I are usable for deriving a signature value y, y', e on a message m to be sent within the network to a second computer node B, C, D for verification.

The step of generating a random secret key sk can comprise the use of two primes p and q. The product of the two primes can then be part of the public key pk. As this approach is based on the hardness of factoring a secure cryptographic system can be achieved.

In another approach the step of generating a random secret key sk can comprise selecting an integer value d which defines a class group G and selecting two elements g and z of the class group G. As this approach is based on the hardness of computing roots in groups of unknown order, a more secure cryptographic system can thus be provided. The step of providing the public key pk can then comprise computing a modified public key value d, h, x, e', I under use of the selected two elements g and z and the exponent interval I. This is further confirmed by the hardness of computing roots in groups of unknown order and thus leads to an even more secure cryptographic system.

In accordance with a second aspect of the present invention, there is given a method for providing a signature value y, y', e on a message m in a network of connected computer nodes A, B, C, D, the method executable by a first computer node A comprising the steps of:

selecting an exponent value e from an exponent interval I, wherein each element of the exponent interval I has, with a probability close to certainty, a unique prime factor that is larger than a given security parameter l; and deriving the signature value y, y', e from a provided secret key sk, the selected exponent value e, and the message m, the signature value y, y', e being sendable within the network to a second computer node B, C, D for verification.

The step of deriving the signature value y, y', e can further comprise a computation of the i-th root y of a value derived from the message m and the secret key sk using a cryptographic hash function H. The i is contemplated as the exponent value i. This allows the design of securer cryptographic systems.

In accordance with a third aspect of the present invention, there is given a method for verifying a signature value y, y', e on a message m in a network of connected computer nodes A, B, C, D, the method executable by a second computer B, C, D node comprising the steps of:

receiving the signature value y, y', e from a first computer node A; and verifying whether an exponent value e is contained in an exponent interval I, wherein each element of the exponent interval I has, with a probability close to certainty, a unique prime factor that is larger than a given security parameter l, the signature value y, y', e is invalid if the exponent value e is not contained in the exponent interval I.

The step of verifying can further comprise a computing step of raising a computed signature root value y to the power of the exponent value e. The computed signature root value y forms part of the signature value y, y', e.

FIG. 1 shows a typical network with multiple computer nodes A, B, C, D, where each node can also be contemplated as participating network device. More particularly, the figure shows an example of a common computer system 2, where a random number r is generated. It consists here of four computer nodes A, B, C, and D which are connected via communication lines 5 to the network. Each computer node A, B, C, D may be any type of computer device known in the art from a computer on a chip or a wearable computer to a large computer system. The communication lines 5 can be any communication means commonly known to transmit data or messages from one computer node A, B, C, D to another. For instance, the communication lines 5 may be either single, bi-directional communication lines 5 between each pair of participating network devices A, B, C, D or one unidirectional line in each direction between each pair of computer nodes A, B, C, D. Such communication lines 5 are well known in the art. The common computer system 2 is shown to facilitate the description of the following random number generation protocol.

The following describes in more detail how cryptographic keys sk, pk can be provided as well as a signature value y, y', e on a message m is created. Further, the verification of the signature value y, y', e is shown in more detail.

Cryptographic Keys

Figure 2:
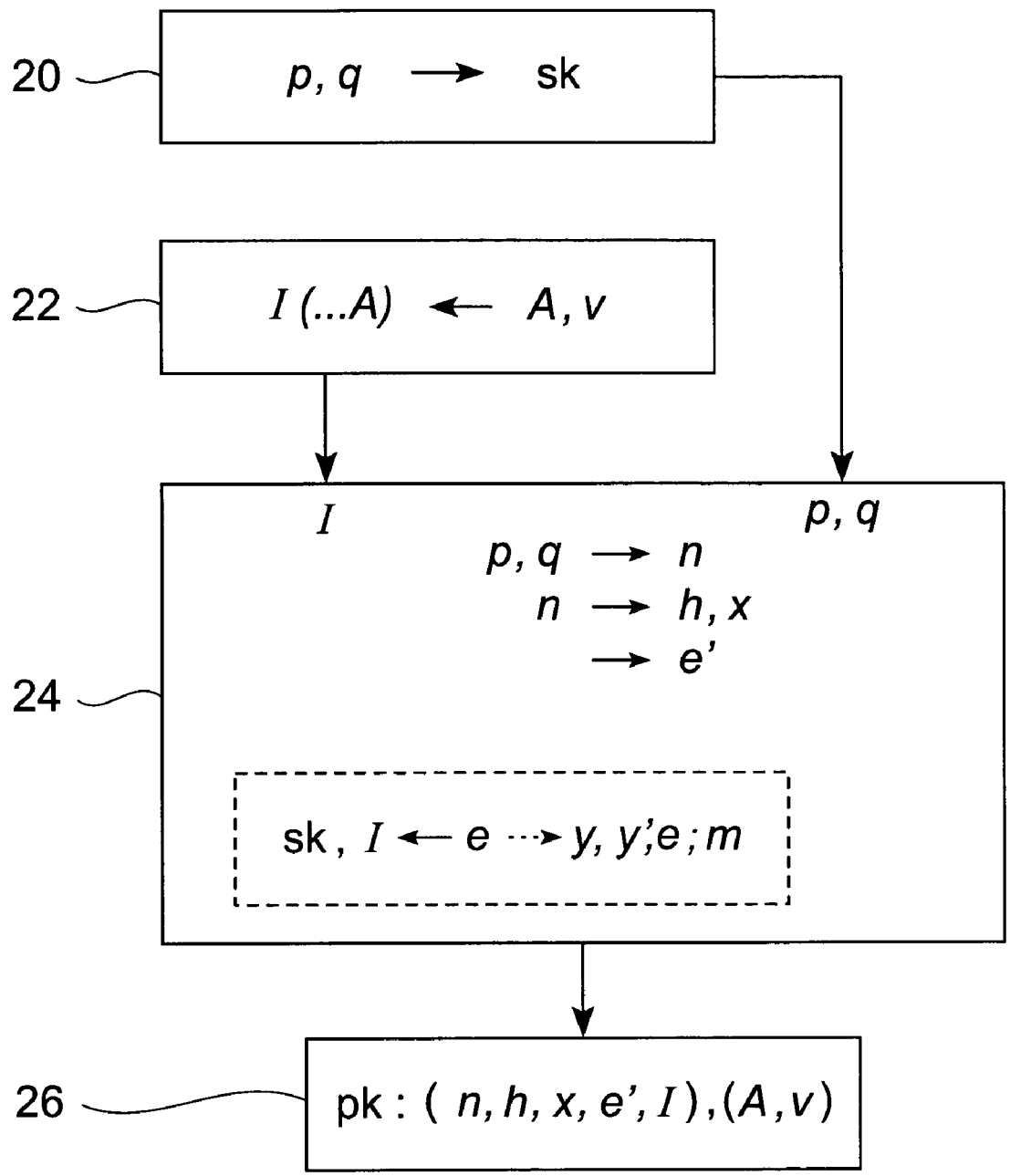
FIG. 2 shows a flow diagram according to a first aspect of the invention.

With reference to FIG. 2, the generation of a secret key sk and a public key pk is now described. The secret key sk and the public key pk are contemplated as cryptographic keys sk, pk which are usable in a network of the connected computer nodes A, B, C, D which apply a signature scheme. In the following it is assumed that the first computer node A executes the following steps. At first, as indicated in box 20, a random secret key sk is generated. For that two primes p and q forming the secret key can be used, whereby the product of the two primes p and q is part of the public key pk. Then an exponent interval I is chosen that can be determined according to the description below, whereby the exponent interval I has a first random limit A, as indicated in box 22. With a probability close to certainty, each element of the exponent interval I has a unique prime factor that is larger than a given security parameter l. More precisely, let n be the product of two sufficiently large primes p and q, h and x two elements from $QR_n$ and e' a random l+1 bit prime. Let H be a hash function whose outputs have l bits. As indicated with box 24, the first computer node A performs some computations and selections in order to provide the public key pk as indicated with box 26. The public key pk finally comprises an exponent-interval description A, v and a public key value n, h, x, e', I which is derived from the random secret key sk. As indicated within box 24, the first computer node A selects an exponent value e from the exponent interval I and a random prime e', computes the product n of the primes p and q and derives from n the two public values h, x. Thereby the random secret key sk and the selected exponent value e are usable for deriving a signature value y, y', e on a message m. This signature value y, y', e can then be sent within the network 5 to a second computer node B, C, D for verification purposes.

In a further embodiment, the generation of the random secret key sk comprises the selection of an integer value d which defines a class group G and the selection of two elements g and z of said class group G. Consequently, a modified public key value d, h, x, e', I can be provided under use of the selected two elements g and z and the exponent interval I, while e' is chosen randomly and h, x are calculates as follows:

$$h = g^{\prod_{e \in I} e}, x = z^{\prod_{e \in I} e}.$$

As this is based on the hardness of computing roots in groups of unknown order, a secure cryptographic system can be provided.

Figure 3:
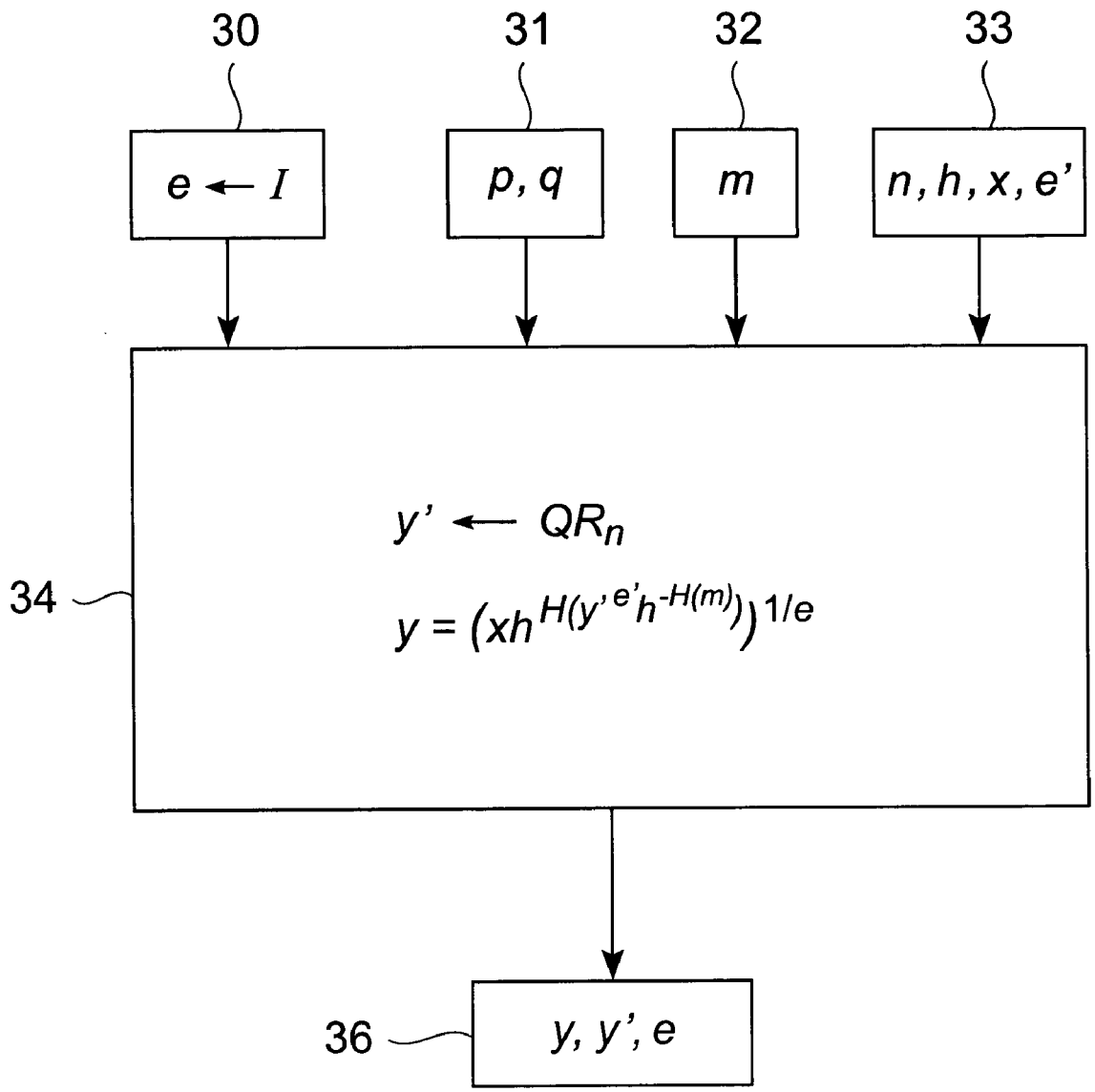
FIG. 3 shows a flow diagram according to a second aspect of the invention.
Figure 4:
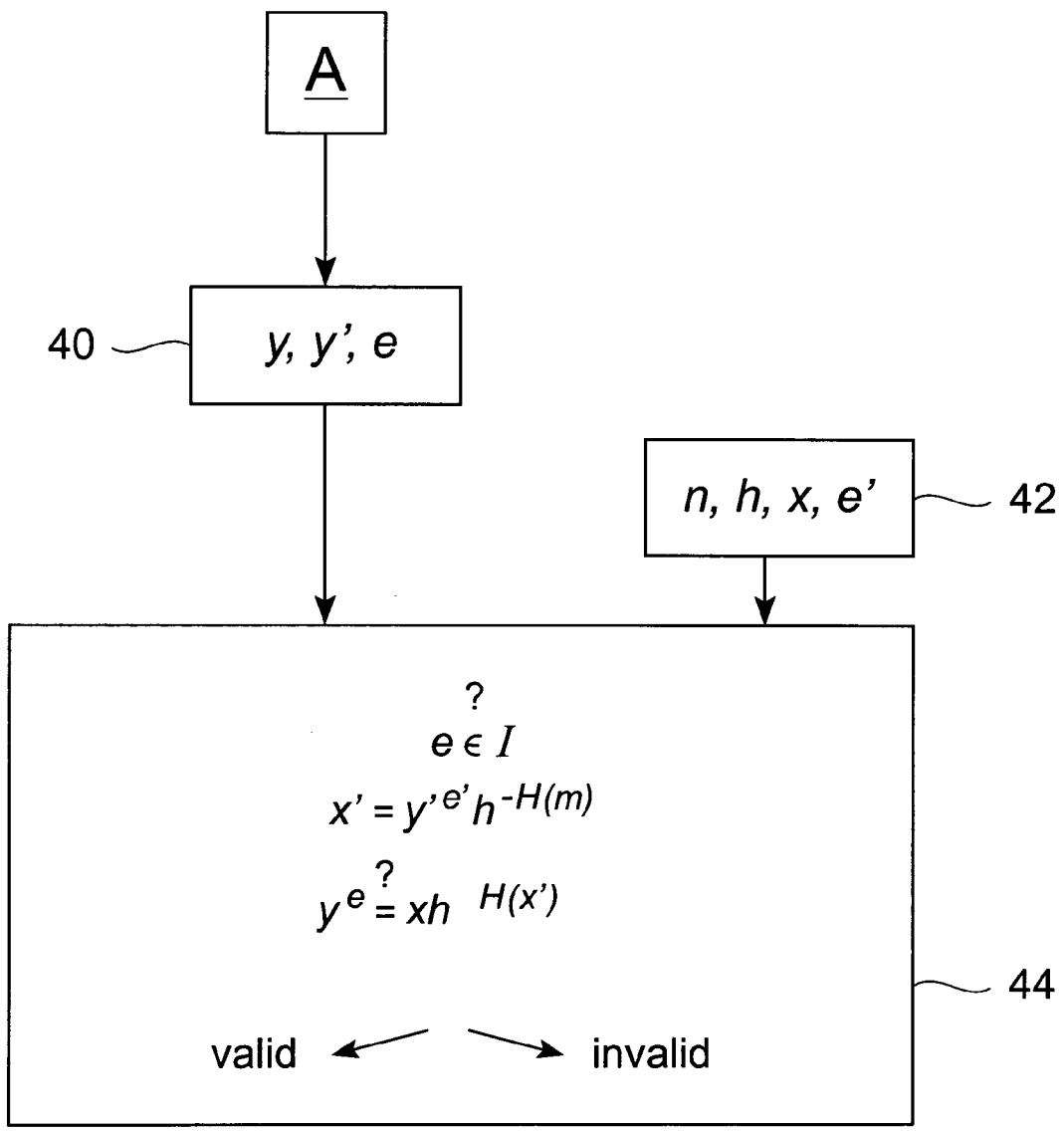
FIG. 4 shows a flow diagram according to a third aspect of the invention.

FIG. 3 shows a flow diagram for deriving the signature value y, y', e that is sendable within the network to the second computer node B, C, D for verification. For the derivation the first computer node A performs a selection of an exponent value e from an exponent interval I as indicated with box 30, wherein each element of the exponent interval I has, with a probability close to certainty, a unique prime factor that is larger than a given security parameter l. The signature value y, y', e is then derived, as indicated with box 34 and mathematically shown below, from the provided secret key p and q as indicated with box 31, the selected exponent value e, the message m as indicated with box 32, and part of the public key value n, h, x, e' as indicated with box 33.

In a further embodiment, the signature value y, y', e can be derived by computing the e-th root y of a value derived from the message m, also referred to as computed signature root value y, and the secret key sk by using a cryptographic hash function H.

Mathematically, to sign a message m, the signer, i.e. the first computer node A, chooses a random element y' from $QR_n$ or from G, in case of class groups, and an exponent value e from I, and computes a y such that $$y^e = xh^{H(x')}$$

$$y'^{e'} = x'h^{H(m)},$$

that means the computed signature root value y can be determined as follows $$y = (xh^{H(y'^{e'}h^{-H(m)})})^{1/e}.$$

To verify a signature, one computes $x' = y'^{e'}h^{-H(m)}$ and checks that $y^e = xh^{H(x')}$ and $e \in I$ holds.

That means for verifying the signature value y, y', e on the message m one second computer node B, C, D receives the signature value y, y', e, as indicated with box 40, from the first computer node A. The second computer node B, C, D verifies by using the provided part of the public key value n, h, x, e' as indicated with box 33 whether or not the exponent value e is contained in the exponent interval I as indicated with box 44. Thereby each element of the exponent interval I should have, with a probability close to certainty, a unique prime factor that is larger than the given security parameter l. The signature value y, y', e is invalid if the exponent value e is not contained in the exponent interval I.

The check comprises computing $y^e$ which means that the computed signature root value y that is part of the signature value y, y', e is raised to the power of the exponent value e as shown in the equation above.

Choosing an Interval

In the following is addressed how an exponent interval I can be chosen. The above scheme can be shown secure if the interval I contains only few integers that have either a distinct prime factor larger than a certain size l or two distinct prime-factors larger than $2^v$ (the integers that do not meet these conditions are called (l,v)-smooth) and no integer with the largest prime factor smaller than $2^v$. Therefore, in order to choose an interval I one need to evaluate the probabilities for that whether a randomly chosen interval meets this condition.

Let $n_1$ and $n_2$ denote the biggest and second biggest prime factor of number n, respectively. Define the quantities $$\Psi(x,y) = \#\{0 < n \leq x : n_1 \leq y\} \text{ and } \Psi(x,y,z) = \#\{0 < n \leq x : n_1 \leq y, n_2 \leq z, \}.$$

It can be shown that the probability that randomly chosen interval $I=[A, A+2^v]$, contains more than $2^{v/5}$ integers that are (l, v)-smooth is at most $\Psi(A, 2^l, 2^v) \, 2^{4v/5}/A$ and that it contains no odd integer with a prime factor smaller than $2^v$ is at most $\Psi(A, 2^v) \, 2^v/A$, provided that $v < \log(A) < v^2$ holds. This now allows one to choose the A, l, and v (and thereby the interval) such that these probabilities are small, i.e., such that I meets the required condition with sufficiently high probability. To evaluate the quantities $\Psi(x,y)$ and $\Psi(x,y,z)$ one can use bounds on them that are found in literature.

Any disclosed embodiment may be combined with one or several of the other embodiments shown and/or described. This is also possible for one or more features of the embodiments. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. A method for providing cryptographic keys usable in a network of connected computer nodes applying a signature scheme, the method executable by a first computer node comprising the steps of:

generating a random secret key;

generating an exponent interval I having a plurality of exponent elements, said exponent interval having a specified first random limit, wherein each element of said plurality of exponent elements of the exponent interval has a unique prime factor that is larger than a given security parameter; and providing, at said first computer node, a public key comprising an exponent-interval description including said first random limit, and an interval width specification and a public key value derived from the random secret key, said public key value including a random prime value, a number (n) corresponding to a product of two large prime numbers forming said random secret key, said exponent interval, and two public values from a set of elements having a square root modulo n, such that the random secret key and a selected exponent value from the plurality of exponent elements in said exponent interval I are usable for deriving a signature value on a message to be sent within the network to a second computer node for verification, wherein said deriving includes: computing an e-th root of a value derived from the message and the random secret key using a cryptographic hash function, the e being an exponent value from exponent interval I, and receiving, at said second computer node, said signature value and said public key value, wherein verification of said signature value at said second computer node, includes raising said computed signature root value that forms part of said signature value to the power of the exponent value e, and, from said provided public key value, confirming that said exponent value e is contained in an exponent interval I having said plurality of exponent elements.

2. The method according to claim 1, wherein the step of generating the random secret key comprises using two primes, the product of which is part of the public key.

3. The method according to claim 1, wherein the step of generating the random secret key comprises selecting an integer value defining a class group and selecting two elements of the class group.

4. The method according to claim 3, wherein the step of providing a public key comprises computing a modified public key value under use of the selected two elements and the exponent interval.

5. A method for verifying a signature value on a message in a network of connected computer nodes, the method executable by a second computer node comprising the steps of:
  receiving the signature value from a first computer node;
  providing, at the second computer node, a public key comprising: an exponent-interval description having a specified first random limit and an interval width specification and, a public key value derived from the random secret key, said public key value including a random prime value, a number (n) corresponding to a product of two large prime numbers forming said random secret key, an exponent interval I having a plurality of exponent elements, and two public values from a set of elements having a square root modulo n, said signature value being derived from said random secret key and a selected exponent value from the plurality of exponent elements in said exponent interval I on a message to be received within the network at a second computer node for verification, said deriving including: computing an e-th root of a value derived from the message and the random secret key using a cryptographic hash function, the e being an exponent value from exponent interval I; and
  verifying, at said second computer node, using said provided public key value, whether an exponent value is contained in an exponent interval I having said plurality of exponent elements, wherein each element of said plurality of exponent elements of the exponent interval has a unique prime factor that is larger than a given security parameter, the signature value being invalid if the exponent value is not contained in the exponent interval, and, the verifying of said signature value at said second computer node further comprises: receiving, at said second computer node, said signature value and said public key value, and raising said computed signature root value that forms part of said signature value to the power of the exponent value e.

6. A program storage device readable by machine, tangibly embodying a program of instructions executable by the machine to perform method steps for providing cryptographic keys usable in a network of connected computer nodes applying a signature scheme, said method steps comprising the steps of:
  generating a random secret key;
  generating an exponent interval I having a plurality of exponent elements, said exponent interval having a specified first random limit, wherein each element of said plurality of exponent elements of the exponent interval I has a unique prime factor that is larger than a given security parameter; and
  providing, at said first computer node, a public key comprising: an exponent-interval description having said specified first random limit and an interval width specification, and a public key value derived from the random secret key, said public key value including a random prime value, a number (n) corresponding to a product of two large prime numbers forming said random secret key, said exponent interval I, and two public values from a set of elements having a square root modulo n, such that the random secret key and a selected exponent value from the exponent interval are usable for deriving a signature value on a message to be sent within the network to a second computer node for verification, wherein said deriving includes: computing an e-th root of a value derived from the message and the random secret key using a cryptographic hash function, the e being an exponent value from exponent interval I, and
  receiving, at said second computer node, said signature value and said public key value, wherein verification of said signature value at said second computer node, includes raising said computed signature root value tat forms part of said signature value to the power of the exponent value e, and, from said provided public key value, and confirming that said exponent value e is contained in an exponent interval I having said plurality of exponent elements.

7. A program storage device readable by machine, tangibly embodying a program of instructions executable by the machine to perform method steps for providing a signature value on a message in a network of connected computer nodes, said method steps comprising the steps of:
  receiving the signature value from a first computer node,
  providing, at said second computer node, a public key comprising: an exponent-interval description having a specified first random limit and an interval width specification and, a public key value derived from a random secret key, said public key value including a random prime value, a number (n) corresponding to a product of two large prime numbers forming said secret key, an exponent interval I having a plurality of exponent elements, and two public values from a set of elements having a square root modulo n, said signature value being derived from said random secret key and a selected exponent value from the plurality of exponent elements in said exponent interval I on a message to be received within the network at a second computer node for verification, said deriving including: computing an e-th root of a value derived from the message and the secret key using a cryptographic hash function, the e being an exponent value from exponent interval I; and
  verifying, at said second computer node, using said provided public key value, whether an exponent value is contained in an exponent interval I having a plurality of exponent elements, wherein each element of the exponent interval has a unique prime factor that is larger than a given security parameter, the signature value being invalid if the exponent value is not contained in the exponent interval, and, the verifying of said signature value at said second computer node further comprises: receiving, at said second computer node, said signature value and said provided public key value, and raising said computed signature root value that forms part of said signature value to the power of the exponent value e.

* * * * *